Feb. 7, 1967  M. BOBO  3,302,926
SEGMENTED NOZZLE DIAPHRAGM FOR HIGH TEMPERATURE TURBINE
Filed Dec. 6, 1965  2 Sheets-Sheet 2
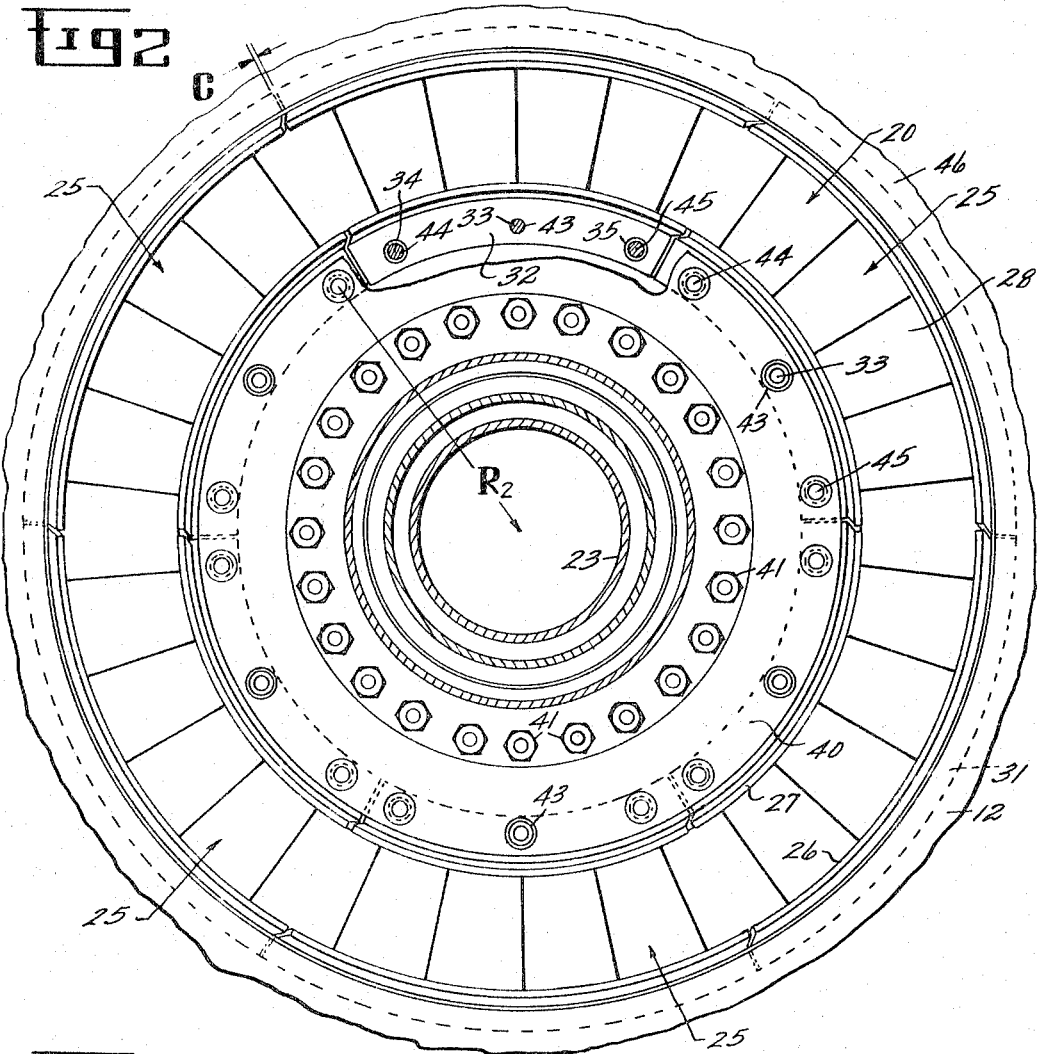
Fig. 2
Fig. 4
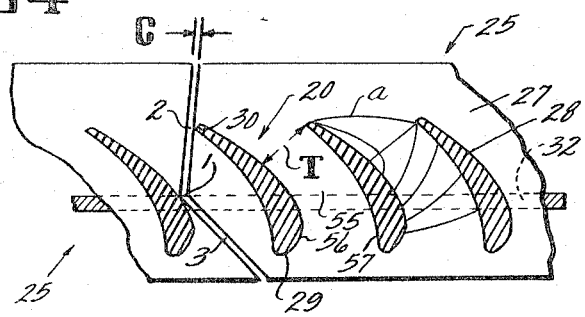
INVENTOR.
MELVIN BOBO
BY
George R. Powers
ATTORNEY United States Patent Office 3,302,926
Patented Feb. 7, 1967

3,302,926
SEGMENTED NOZZLE DIAPHRAGM FOR HIGH
TEMPERATURE TURBINE
Melvin Bobo, Topsfield, Mass., assignor to General
Electric Company, a corporation of New York
Filed Dec. 6, 1965, Ser. No. 511,865
9 Claims. (Cl. 253—78)

This invention relates to segmented nozzle diaphragms for high temperature turbines and, more particularly, to a nozzle diaphragm segmented along lines of minimum pressure gradient to minimize leakage.

In a gas turbine engine, an annular nozzle diaphragm is conventionally positioned between the combustor and the turbine wheel for directing the high temperature combustion products to the turbine wheel. The nozzle diaphragm is sometimes a complete annular ring structure formed and mounted in the engine as an integral unit. Since the combustion products flowing through the nozzle diaphragm are typically in the vicinity of 1800° F. or even higher, substantial thermal stresses can be produced in such an arrangement. If sufficiently severe, these stresses can cause cracking or even failure of the nozzle diaphragm. To reduce these stresses, nozzle diaphragm assemblies are often segmented and mounted with the segments in circumferentially spaced relationship in order to permit expansion and contraction in response to temperature changes. While this approach is quite effective in reducing stress and fatigue difficulties, it can present leakage problems. More particularly, leakage can occur through the openings between segments and thus reduce efficiency. Wherever such leakage occurs, there is, of course, a pressure gradient across the segmented nozzle shroud ring at the opening with leakage occurring from the high pressure to the low pressure side of the shroud ring. This problem can be alleviated by use of various types of sealing means to prevent leakage through the circumferential spaces between adjacent segments of the nozzle diaphragm. These solutions are not always entirely satisfactory, however, since the sealing means add to the complexity of the assembly and to the cost of manufacture. In addition, the seals increase the weight of the complete nozzle diaphragm. While this weight increase is not usually great, it is nevertheless undesirable in high performance gas turbine engines used for aircraft propulsion. Furthermore, it is possible for prior art seal arrangements to break loose and cause substantial engine damage.

It has been found that this leakage can be reduced substantially without the use of elaborate sealing arrangements by constructing the nozzle diaphragm such that the diaphragm support flanges, which are circumferential flanges extending radially from the shroud rings, are positioned axially to minimize the pressure gradients across the openings between adjacent segments. Consequently, leakage may be reduced. While such an arrangement is generally quite satisfactory, the leakage, particularly downstream of the nozzle throat area, may still be significant. To attain highly efficient operation, it is, of course, desirable that leakage be reduced to the fullest extent.

It is, therefore, an object of this invention to provide an improved turbine nozzle diaphragm in which both thermal stresses and leakage are maintained at a low level.

Another object of this invention is to provide a turbine nozzle diaphragm of the segmented type having lower leakage than heretofore possible without the use of sealing means between adjacent segments.

A further object is to provide an improved nozzle diaphragm having low leakage between adjacent nozzle diaphragm segments, the structure additionally being simple in design and relatively easy and inexpensive to manufacture.

Briefly stated, in carrying out the invention in one form, a turbine nozzle diaphragm or similar stator structure is segmented along lines of minimum pressure gradient to minimize leakage. More particularly, the nozzle diaphragm is comprised of outer and inner annular shroud members and a plurality of vanes radially positioned between the shroud members and secured thereto. Circumferential flanges project radially outward and inward from the outer and inner shroud members, respectively. The shroud members are segmented downstream of these flanges along lines on which the pressure between the shroud members during turbine operation is substantially equal to the static pressure existing on the flange sides of the shroud members.

By a further aspect of the invention, each shroud member is segmented intermediate an adjacent pair of vanes, the separation between each pair of adjacent segments downstream of the associated flange following along a line defined by a first point adjacent the convex vane side at the downstream side of the flange and a second point adjacent the trailing edge of the concave vane side. By a still further aspect of the invention, the nozzle segments are supported in the turbine by support means, the circumferential spacing between the shroud segments being such that the segments expand into abutting relationship at the normal operating temperature of the turbine. Due to the abutting relationship in combination with the low pressure gradient existing in accordance with the present invention, radial leakage during turbine operation is substantially prevented.

While the specification concludes with claims particularly pointing out and distinctly claiming the subject matter forming the invention, the invention, together with further objects and advantages, may best be understood by reference to the following description taken in conjunction with the accompanying drawings in which:

FIG. 2 is a view, partially cut away, of the annular nozzle diaphragm and its support structure, the view being taken along viewing line 2—2 of FIG. 1, but showing the complete diaphragm rather than the portion illustrated by FIG. 1;

FIG. 3 is a pictorial view of one of the nozzle diaphragm segments;

FIG. 4 is a view taken along viewing line 4—4 of FIG. 1 which illustrates the precise manner in which the nozzle diaphragm is segmented.

Figure 1:
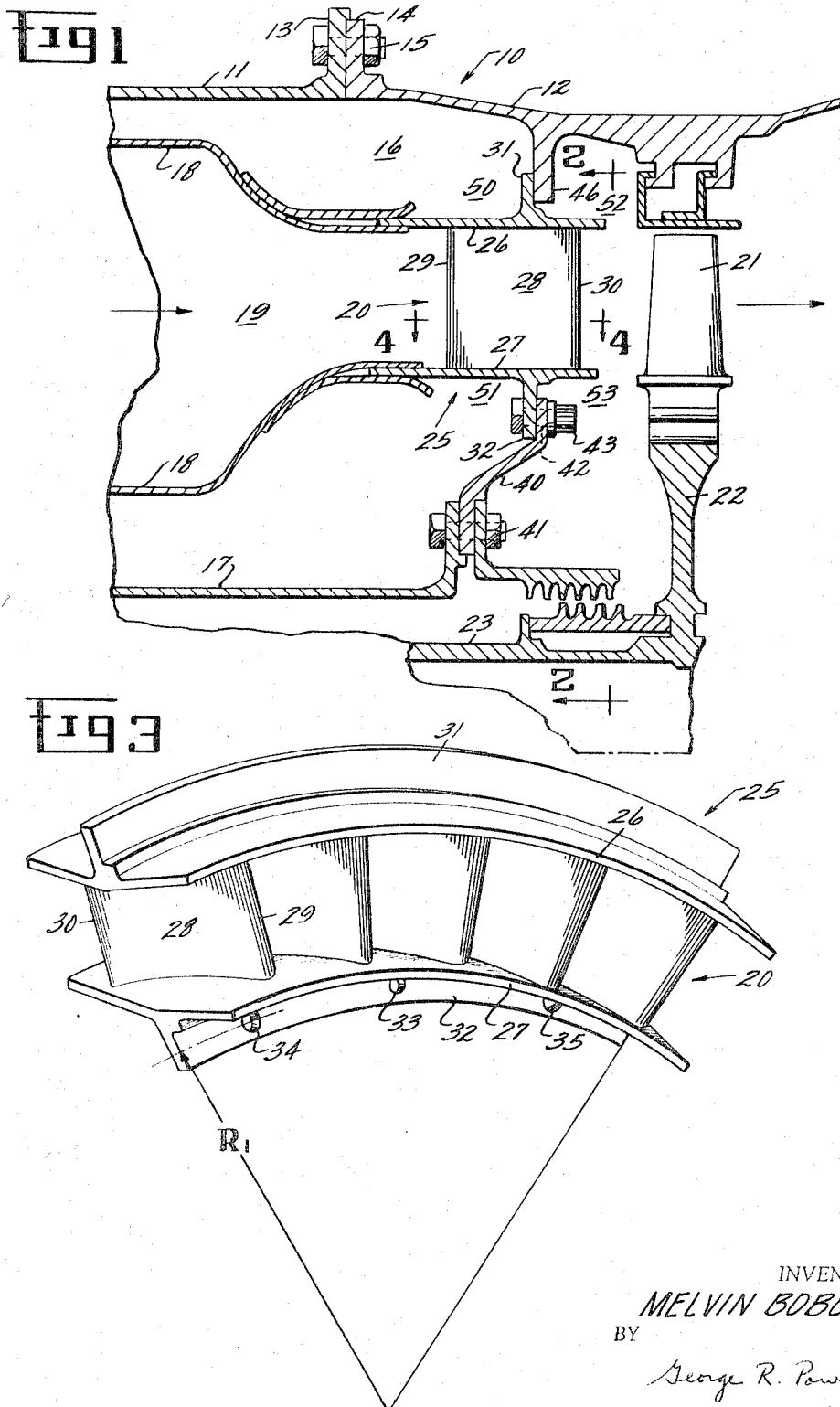
FIG. 1 illustrates in cross section a portion of the nozzle diaphragm of this invention, the diaphragm being shown mounted in a gas turbine engine.

Referring first to FIG. 1, a portion of a gas turbine engine is illustrated, the engine having an outer cylindrical casing 10 comprised of annular sections 11 and 12 secured together at the flanges 13 and 14 by circumferentially spaced bolts 15 as illustrated or by other suitable fastening means. An annular combustor indicated generally by 16 is defined between the casing 10 and an inner wall 17. The inner wall 17, a stationary member having support capability, may be, for example, an annular flange extending axially from the rear frame of the compressor (not shown). An annular combustion liner 18 is located within the combustor 16, the liner 18 having suitable openings therein (not shown) through which high pressure air supplied by the compressor to the combustor 16 can flow to support combustion in the interior 19 of the liner 18.

An annular nozzle diaphragm indicated generally by 20 is located at the aft end of the combustion liner 18 for supplying the hot products of combustion to a row of turbine buckets 21 at the proper velocity and at the proper angle. The turbine buckets 21 are peripherally mounted on a turbine rotor wheel 22 which, along with its associated shaft 23, is rotatably mounted within the casing 10 by suitable mounting means not illustrated.

The nozzle diaphragm 20 is comprised of a plurality of segments 25 as shown by FIG. 2, one of the segments being individually illustrated by FIG. 3. By segmenting the nozzle diaphragm 20, thermal stresses are maintained at relatively low levels. With reference now to FIGS. 1–3, it will be seen that the nozzle diaphragm 20 is comprised of an outer annular shroud ring formed by a plurality of arcuate outer shroud members 26, an inner annular shroud ring formed of a plurality of arcuate inner shroud members 27, and a plurality of vanes 28 radially positioned between the shroud members 26 and 27 and secured thereto, the vanes having axially spaced leading and trailing edges 29 and 30, respectively. A single, segmented flange 31 projects radially outward from the outer shroud members 26 substantially midway between the leading and trailing edges of the vanes 28, the flange 31 circumferentially surrounding the outer shroud ring. A similar single flange 32 projects inwarly from the inner shroud members 27, its axial position also being substantially midway between the leading and trailing edges of the vanes 28. An opening 33 is provided in the flange 32 at the circumferential center of each segment 25, and openings 34 and 35 are circumferentially spaced on opposite sides of the opening 33. If desired, openings 34 and 35 may be made larger than openings 33 as illustrated; the reason for the difference in size will soon become obvious. The segments 25 are formed with the openings 33, 34, and 35 at a definite known radius $R_1$ from the center of curvature of the segments.

Turning now to FIGS. 2 and 3, each segment 25 of the nozzle diaphragm 20 is formed as a 60° segment by conventional manufacturing techniques. The entire diaphragm 20 may, for example, be either cast or fabricated from sheet metal as a complete integral structure, the diaphragm then being cut to form the indivual segments 25. Alternatively, similar techniques can be used to individually form the segments. It will also be obvious that the nozzle diaphragm 20 may have various numbers of segments 25. For example, the nozzle diaphragm 20 may be comprised of twelve 30° segments instead of the six 60° segments illustrated; it has been found, however, that it is both convenient and practical to use six 60° segments as illustrated. In general, any number of segments may be used so long as the total number of vanes is divisible by that number; this assures that all segments have an equal number of vanes.

Turning back to FIGS. 1 and 2, a support cone 40 is secured to the inner wall 17 by suitable means such as circumferentially spaced bolts 41. The support cone 40 has a series of openings 42 at a radius $R_2$ from the axis of the engine, the circumferential spacing between the openings 42 being the same as the spacing between the openings 33, 34 and 35 of the diaphragm segments 25. The segments 25 are placed in the gas turbine engine with openings 33, 34 and 35 aligned with respective ones of the openings 42. A first bolt 43 is then passed through each opening 33 and the associated opening 42. The bolt 43 and the openings 33 and 42 form a snug fit, i.e., the bolt 43 is said to be "body-bound," so that the circumferential center of the segment 25 is held in a fixed position. Similar bolts 44 and 45 are loosely received in the openings 34 and 35 so that the ends of the diaphragm segments 25 are free to expand and contract circumferentially relative to their fixed centers. The reason for making the openings 34 and 35 larger than opening 33 will now be apparent. If it is desired to make openings 34 and 35 the same size as opening 33, bolts 44 and 45 must be smaller in diameter than bolt 43. If there is a tendency in practice for the segments 25 to pivot about the bolts 43, the openings 33 and 34 may be formed as circumferentially elongated slots instead of circular holes.

With the segments 25 mounted at the radius $R_2$ from the axis of the engine, there is an assembly clearance C between the shroud members 26 and 27 of adjacent segments 25 since $R_2$ is greater than $R_1$. The radii $R_1$ and $R_2$ and the clearance C are chosen such that the shroud members 26 and 27 of the shroud segments 25 will expand into abutting relationship at the normal operating temperature of the nozzle diaphragm 20. The particular choices of $R_1$, $R_2$, and therefore C depend on a number of factors which must be determined with respect to the particular engine on which the nozzle diaphragm 20 is to be used. For example, the particular material from which the nozzle diaphragm segments 25 are formed must be considered since different materials have different coefficients of thermal expansion. The normal operating temperature of the nozzle diaphragm and the temperature at which the segments 25 are assembled must also be considered. Similarly, the amount of expansion of the support cone 40 must also be taken into consideration; this expansion is generally relatively slight since the support cone 40 is subjected to relatively cool compressed air in the space inwardly of the combustion liner 18 and not to the hot combustion products.

In a particular engine utilizing a turbine nozzle diaphragm of this general type, the nozzle diaphragm segments were formed of Inco 713C having a coefficient of thermal expansion of $8.15 \times 10^{-6}$. So that the diaphragm segments, assembled at a temperature of 70° F., would abut at the normal operating temperature of 1400° F., $R_1$ was 3.474 inches and $R_2$ was 3.490 inches. This gave an assembly clearance C of .017 inch between adjacent segments.

The supporting arrangement described above locates the circumferential centers of the nozzle diaphragm segments 25 in a fixed position and allows circumferential expansion and contraction of the ends of the diaphragm segments 25, particularly the shroud members 26 and 27. The support means for locating the nozzle diaphragm 20 axially will now be described. A circumferential flange 46 extends radially inward from the casing 10 at the downstream face of the segmented flange 31 which extends outwardly from shroud members 26. The high pressure products of combustion entering the nozzle diaphragm 20 and the high pressure compressed air upstream of the flange 31 hold the downstream face of the flange 31 in contact with the flange 46. In addition, engagement between the support cone 40 and the flange 32 helps locate the nozzle diaphragm 20 axially.

In the introductory portion of this specification, it was pointed out that leakage has been a significant problem with respect to certain prior art turbine nozzle diaphragms. It was also pointed out that such leakage can be reduced substantially by constructing the nozzle diaphragm such that the support flanges are located to reduce pressure gradients. It will now be shown that the present invention can reduce this leakage still further by segmenting the nozzle diaphragm on lines of minimum pressure gradient.

The present invention resides in the precise manner in which the shroud rings are segmented into the shroud members 26 and 27. To understand the reason for segmenting the shroud rings in the manner shown, it will be well to review briefly the aerodynamics of high temperature combustion products flowing through a turbine nozzle diaphragm. With reference, therefore, to FIGS. 1 and 4, it will be observed that the air within the entire annular combustor 16 is at a substantially uniform high pressure. In other words, the static pressure in area 50 on the outer surfaces of the shroud members 26 and in area 51 on the inner surfaces of the shroud members 27 upstream of the flanges 31 and 32, respectively, is not only essentially uniform, but also substantially equal to the pressure of the high pressure gases entering the fluid flow passageways 55 defined between adjacent pairs of vanes 28. Similarly, the static pressure in area 52 on the outer surfaces of the shroud members 26 and in area 53 on the inner surfaces of the shroud members 27 downstream of the flanges 31 and 32, respectively, is both substantially uniform and equal to the pressure of the relatively low pressure gases being discharged from the passageways 55, the combustion gases having been accelerated through the passageways 55.

As just indicated, the combustion products experience a significant drop in pressure in flowing through the passageways 55. With reference now to FIG. 4, the pressure drop of the combustion products in the passageways 55 is illustrated graphically by means of lines of constant pressure drawn between two of the vanes 28. It will be noted that the constant pressure line $a$ represents the pressure of the gases being discharged by the nozzle diaphragm 20 and, therefore, the static pressure existing in areas 52 and 53 and acting on the outer and inner surfaces or flange sides, of the outer and inner shroud members 26 and 27, respectively, downstream of the flanges 31 and 32. By segmenting the shroud rings along this constant pressure line, there would be no pressure gradient existing across the segmentation. In practice, this can be approximated by segmenting the shroud rings such that the separation between each pair of adjacent shroud members downstream of their associated flanges follows along a line defined by a first point 1 adjacent the convex vane side 56 at the downstream sides of the flanges and a second point 2 adjacent the trailing edge 30 of the concave vane side 57. Since the clearance C is closed at the normal operating temperature of the turbine, the very small pressure gradients encountered in practice when the shroud rings are segmented in accordance with this invention substantially prevent radial leakage of combustion products through the joints between adjacent pairs of the shroud members 26 and 27 to the areas 52 and 53. It is extremely desirable that this leakage be minimized since escaping combustion products do no work on the turbine buckets 21, their energy thus being lost to the system.

Upstream of the downstream sides of the flanges, the shroud rings are segmented such that the separation between each pair of adjacent shroud members follows along a line defined by the first point 1 and a third point 3 axially aligned with and substantially midway between the leading edges 29 of adjacent vanes 28. Since the segmentation upstream of the throat areas T cannot coincide with a constant pressure line, it is likely that there will be somewhat greater leakage of compressed air from the areas 50 and 51 into the passageway 55 upstream of the flanges 31 and 32 than leakage of combustion products out of the passageway 55 downstream of the flanges. This leakage of air into the passageways 55 does not result in substantial losses, however, since such air is accelerated through the passageways 55 in essentially the same manner as the combustion products. The small losses which actually occur are primarily mixing losses.

There is, of course, a sizeable pressure difference between the high pressure areas 50 and 51 and the adjacent low pressure areas 52 and 53, respectively. In order to prevent leakage between these areas through the circumferential spaces between adjacent portions of the flanges 31 and 32, the circumferentially continuous flange 46 and the support cone 40 overlap the flanges to act as seals.

It will thus be seen that this invention provides a nozzle diaphragm in which both leakage and thermal stresses are maintained at low levels without the use of separate sealing means. In addition, it will be obvious to those skilled in the art that the invention can be used in other turbomachines by segmenting stator assemblies along lines of minimum pressure gradient.

It will be understood that the invention is not limited to the specific details of the construction and arrangement of the particular embodiment illustrated and disclosed herein. It is therefore intended to cover in the appended claims all such changes and modifications which may occur to those skilled in the art without departing from the true spirit and scope of the invention.

What is claimed as new and is desired to secure by Letters Patent of the United States is:

1. In a turbine, a turbine nozzle diaphragm comprising:
   an outer annular shroud ring,
   an inner concentric shroud ring within said outer shroud ring,
   and a plurality of radially extending vanes positioned between said shroud rings and secured thereto, said vanes having axially spaced leading and trailing edges and defining therebetween flow passageways of varying cross-sectional area,
   at least one of said shroud rings having a single circumferential flange projecting radially therefrom,
   said flange being oppositely directed from said vanes,
   said shroud ring and the flange associated therewith being comprised of at least two segments,
   the separation between each pair of adjacent segments downstream of said associated flange following along a line on which the pressure between said inner and outer shroud rings during turbine operation is substantially equal to the pressure downstream of said associated flange.

2. A turbine nozzle diaphragm as defined by claim 1 in which each of said shroud rings is segmented and has a circumferential flange associated therewith.

3. A turbine nozzle diaphragm as defined by claim 2 in which said radial vanes have concave and convex vane sides connecting said leading and trailing edges, the concave vane side of each vane forming with the convex vane side of the adjacent vane a nozzle passageway, said shroud rings and the associated flanges being segmented intermediate a pair of adjacent vanes, the separation between each pair of adjacent segments of each shroud ring downstream of the associated flange being along a line defined by a first point adjacent the convex vane side at the downstream side of said associated flange and a second point adjacent the trailing edge of said concave vane side.

4. A turbine nozzle diaphragm as defined by claim 3 in which the separation between each pair of adjacent segments of each shroud ring upstream of the downstream side of said associated flange follows along a line defined by said first point adjacent the convex vane side and a third point axially aligned with and substantially midway between the leading edges of said pair of adjacent vanes.

5. A turbine nozzle diaphragm as defined by claim 4 including means engaging said inner and outer flanges to support the diaphragm segments in said turbine.

6. A turbine nozzle diaphragm as defined by claim 5 in which the circumferential spacing between the segments of said shroud rings is such that said segments expand into abutting relationship at the normal operating temperature of said turbine, whereby the low pressure gradient across the abutting portions of said shroud ring segments substantially prevents radial leakage therebetween during turbine operation.

7. In a fluid flow machine, a stator assembly comprising
   an outer annular shroud ring,
   an inner concentric shroud ring within said outer shroud ring,
   and a plurality of radially extending, fluid turning vanes positioned between said shroud rings and secured thereto, said vanes having axially spaced leading and trailing edges,
   at least one of said shroud rings being comprised of at least two segments,
   the separation between each pair of adjacent segments following in part along a line on which the pressure between said shroud rings during machine operation is substantially equal to the pressure on the opposite side of said segmented shroud ring, said line extending at least a substantial portion of the axial distance between the leading and trailing edges of said vanes.

8. A stator assembly as defined by claim 7 including means supporting said segments within said fluid flow machine.

9. A stator assembly as defined by claim 8 in which the circumferential spacing between the segments of said segmented shroud ring is such that said shroud ring segments expand into abutting relationship at the normal operating temperature of said fluid flow machine, whereby the low pressure gradient across the abutting portions of said shroud ring segments substantially prevents radial leakage therebetween during machine operation.

References Cited by the Applicant

UNITED STATES PATENTS

| | | |
|---|---|---|
| 2,488,875 | 11/1949 | Morley. |
| 2,510,606 | 6/1950 | Price. |
| 2,543,355 | 2/1951 | Davis et al. |
| 2,675,672 | 4/1954 | Schorner. |
| 2,799,473 | 7/1957 | Smith et al. |
| 2,942,844 | 6/1960 | Neate. |
| 2,945,671 | 7/1960 | Petrie. |
| 3,142,475 | 7/1964 | Bobo et al. |

FOREIGN PATENTS

| | | |
|---|---|---|
| 1,326,037 | 3/1963 | France. |
| 790,280 | 2/1958 | Great Britain. |

MARTIN P. SCHWADRON, *Primary Examiner.*

E. A. POWELL, Jr., *Assistant Examiner.*